United States Patent
Lu et al.

(10) Patent No.: US 7,926,954 B2
(45) Date of Patent: Apr. 19, 2011

(54) LIGHT SHIELD USED IN PROJECTOR

(75) Inventors: Hou-Chen Lu, Taipei Hsien (TW); Kai Huang, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 471 days.

(21) Appl. No.: 12/110,544

(22) Filed: Apr. 28, 2008

(65) Prior Publication Data

US 2009/0051885 A1    Feb. 26, 2009

(30) Foreign Application Priority Data

Aug. 23, 2007    (CN) .......................... 2007 1 0201444

(51) Int. Cl.
*G03B 21/14* (2006.01)
*F21V 1/12* (2006.01)

(52) U.S. Cl. ............. 353/61; 353/97; 361/692; 454/184

(58) Field of Classification Search ................ 353/61, 353/60, 57, 75, 97; 362/373; 361/692, 690; 454/184

See application file for complete search history.

(56) References Cited

U.S. PATENT DOCUMENTS

| 2007/0236668 A1* | 10/2007 | Suzuki ............................. 353/57 |
| 2007/0258249 A1* | 11/2007 | Minami et al. ................. 362/373 |
| 2009/0051885 A1* | 2/2009 | Lu et al. ........................... 353/97 |
| 2009/0323362 A1* | 12/2009 | Lu et al. ........................ 362/376 |

FOREIGN PATENT DOCUMENTS

| CN | 1434347 A | * | 8/2003 |
| CN | 1468388 A | * | 1/2004 |
| CN | 2650180 Y | * | 10/2004 |
| JP | 2003-262921 A |   | 9/2003 |

\* cited by examiner

*Primary Examiner* — John R Lee
(74) *Attorney, Agent, or Firm* — Andrew C. Cheng

(57) ABSTRACT

A projector includes a casing, a light source, and a heat dissipation device. The light source and the heat dissipation device are installed inside the casing. Two openings are formed at two sides of the casing opposing to the light source. A light shield is positioned on one of the two openings. The light shield has a fixing plate, and a plurality of first parallel light-shielding plates and a plurality of second parallel light-shielding plates for blocking light leaking from the openings.

14 Claims, 5 Drawing Sheets

US 7,926,954 B2

LIGHT SHIELD USED IN PROJECTOR

BACKGROUND

1. Field of the Invention

The present invention relates to a light shield, and more particularly to a light shield used in an electronic device having a light source therein.

2. Description of Related Art

Electronic devices, such as projectors, have light sources used for providing intense light for projecting images. Projectors include a casing, a light source installed inside the casing, a lens module, and a fan. The casing has an inlet opening and an outlet opening, and the light source is disposed between the inlet opening and the outlet opening. The fan is positioned on the inlet opening or the outlet opening and near the light source for generating airflow. However, light generated by the light source often leak out through the inlet opening and/or the outlet opening so that people adjacent to the projector may feel uncomfortable due to the escaping light shining to their eyes. For reducing the light leakage, a light shield is secured on the inlet opening and/or the outlet opening to block light. However, the light cannot be effectively blocked by the light shield.

There is a need to provide a light shield for use in a projector which can effectively reduce light leaking out of the projector.

SUMMARY

According to an embodiment of the present invention, a projector including a casing, a light source and a heat dissipation device. The light source and the heat dissipation device are installed inside the casing. Two openings are formed at two sides of the casing opposing to the light source. A light shield is positioned on one of the two openings. The light shield has a fixing plate, and a plurality of first parallel light-shielding plates and a plurality of second parallel light-shielding plates for blocking light leaking from the openings.

BRIEF DESCRIPTION OF THE DRAWINGS

Many aspects of the present light shield used in a projector can be better understood with reference to the following drawings. The components in the drawings are not necessarily drawn to scale, the emphasis instead being placed upon clearly illustrating the principles of the present light shield used in a projector. Moreover, in the drawings, like reference numerals designate corresponding parts throughout the several views.

DETAILED DESCRIPTION OF THE EMBODIMENTS

Figure 1:
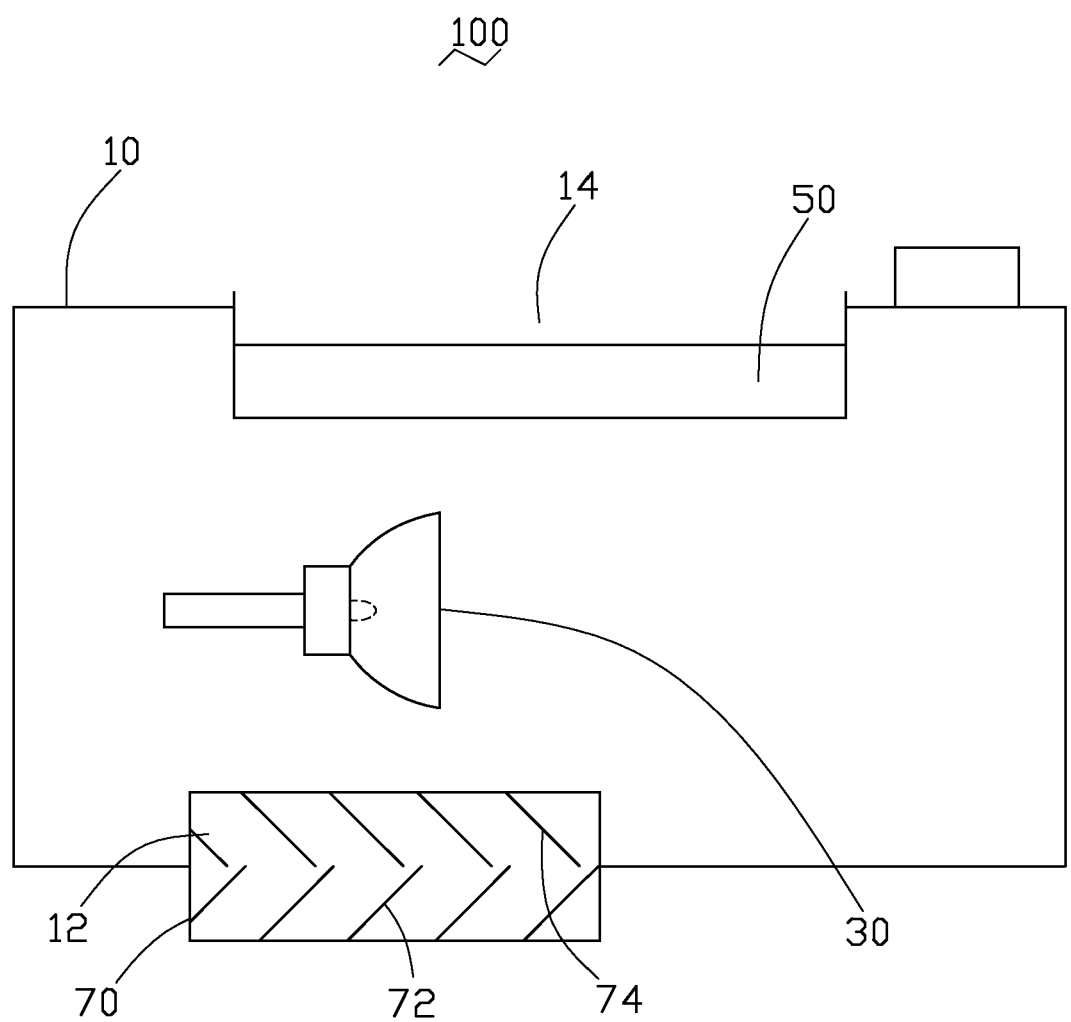
FIG. 1 is a schematic view of a projector in accordance with an exemplary embodiment of the present invention.

Referring to FIG. 1, a projector 100 according to an exemplary embodiment of the present invention is shown. The projector 100 comprises a casing 10, a light source 30 installed inside the casing 10, and a heat dissipation device 50. The projector 100 further comprises a projecting lens and a lens module (not shown in FIG. 1). The lens module is used to transfer light generated by the light source 30 to the projecting lens. The projector 100 can also be some other electronic device that uses a light source therein for providing light.

The light source 30 is used to generate intense light for projection of images. The light source 30 generates a lot of heat during operation. The casing 10 has an inlet opening 14 and an outlet opening 12 respectively formed on lateral walls thereof. The heat dissipation device 50 is positioned on the inlet opening 14 and connected with the casing 10. The light source 30 is positioned between the inlet opening 14 and the outlet opening 12. The heat dissipation device 50 can be a fan or blower. A light shield 70 is positioned on the outlet opening 12 and connected with the casing 10. The light source 30 is located on the path of the airflow generated by the heat dissipation device 50 so as to remove heat. As the air flows past the light source 30, it is heated before reaching and passing through the outlet opening 12.

Figure 2:
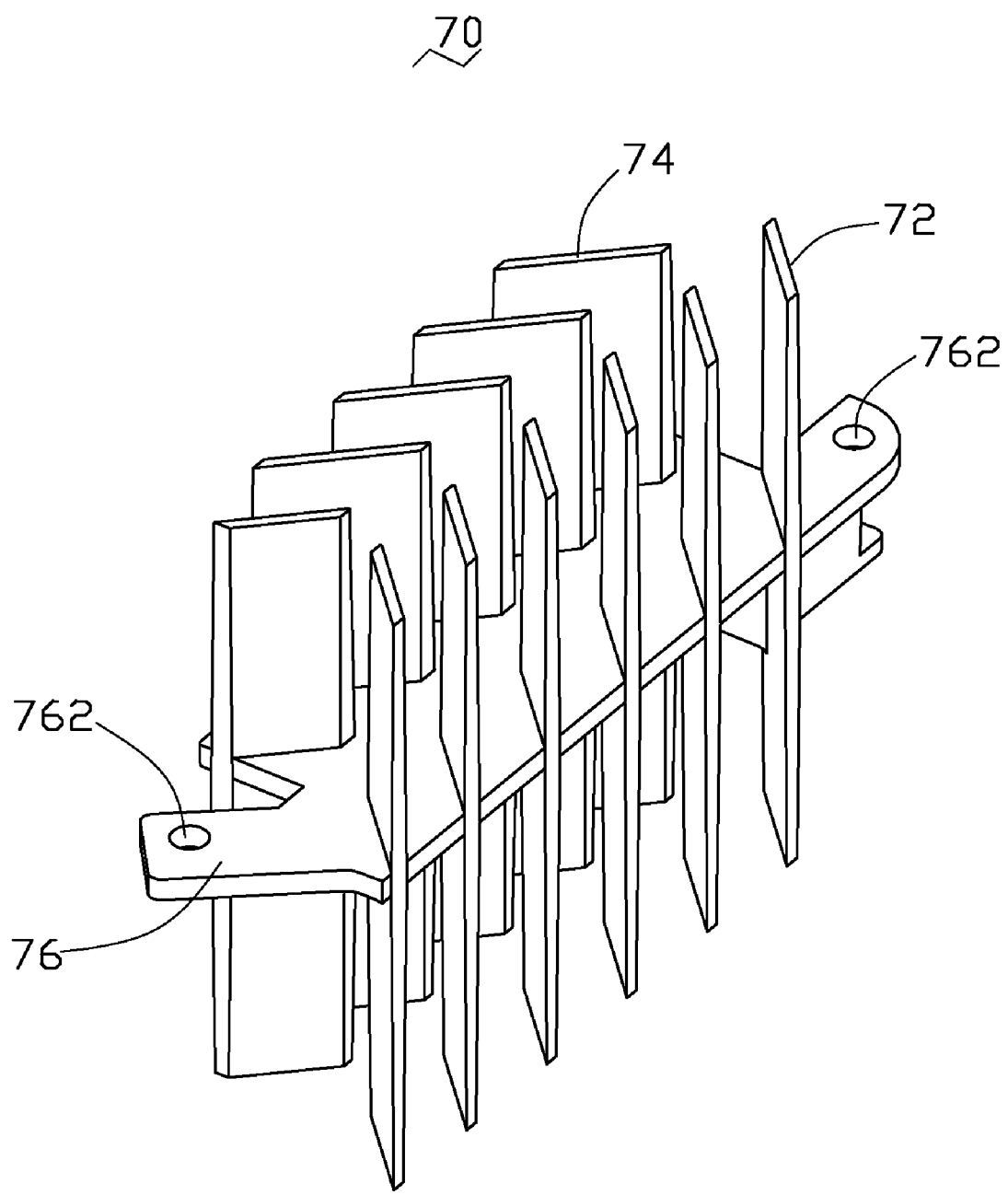
FIG. 2 is an isometric, assembled view of a light shield used in the projector shown in FIG. 1.

Referring to FIG. 2, the light shield 70 comprises a fixing plate 76, a plurality of first light-shielding plates 72, and a plurality of second light-shielding plates 74. The first and second light-shielding plates 72, 74 are connected to the fixing plate 76. The fixing plate 76 has two fixing holes 762 formed on two horizontal distal ends thereof. The fixing plate 76 of the light shield 70 is secured to the casing 10 shown in FIG. 1 by means of two fasteners (not shown) passing through the fixing holes 762 and engaging in receiving holes (not shown) formed on the casing 10. It is to be understood that the light shield 70 can be secured to the casing 10 by any suitable means of fastening or soldering.

Figure 3:
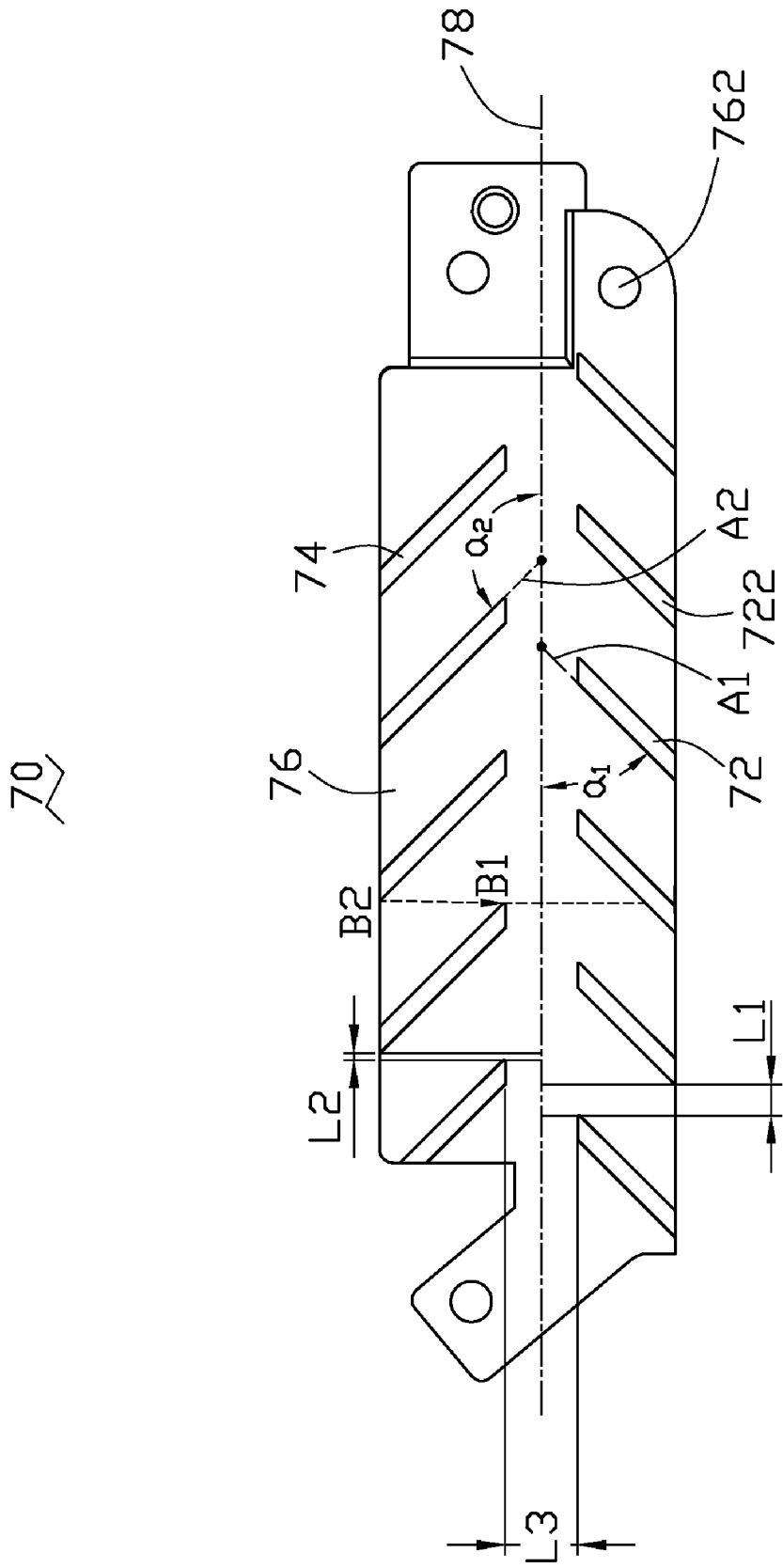
FIG. 3 is a top plan view of the light shield shown in FIG. 2.

Referring also to FIG. 3, the first light-shielding plates 72 are arranged parallel to and spaced from each other at uniform intervals. The second light-shielding plates 74 are also arranged parallel to and spaced from each other at uniform intervals. Each of the first light-shielding plates 72 and the second light-shielding plates 74 has a rectangular shape. The fixing plate 76 has a generally rectangular body. The second light-shieldings 74 are opposite to the light source 30.

In a top plane view of the light shield 70 shown in FIG. 3, the first light-shielding plates 72 and the second light-shielding plates 74 are respectively located at a top side and a bottom side of the fixing plate 76. The fixing plate 70 of the light shield 70 has a central line 78 in a middle between the top and bottom sides as indicated by a dashed line. The first light-shielding plates 72 and the second light-shielding plates 74 are respectively arranged at two lateral sides of the central line 78. Distal ends of the first light-shielding plates 72 and the second light-shielding plates 74 are spaced from the central line 78. The light-shielding plates 72, 74 are disposed slantwise relative to the central line 78. A line A1 is used to indicate where a plane of one of the light-shielding plates 72 intersects the central line 78 in the top plane view. A line A2 is used to indicate where a plane of one of the light-shielding plates 74 intersects the central line 78 in the top plane view. A first angle $\alpha 1$ is an angle between the line A1 and the central line 78. A second angle $\alpha 2$ is an angle between the line A2 and the central line 78.

In the present embodiment, the first angle $\alpha 1$ is a sharp angle and the second angle $\alpha 2$ is an obtuse angle. The first light-shielding plates 72 and the second light-shielding plates 74 are staggered so that the line A1 for each first light-shielding plate 72 does not intersect the central line 78 at a point where the line A2 of any of the second light-shielding plates 74 intersect the central line 78. An interval L1 is defined as a gap between the closest points of two adjacent first light-shielding plates 72 along a direction parallel to the central line 78. Similarly, an interval L2 is defined as a gap between the closest points of two adjacent second light-shielding plates 74 along a direction parallel to the central line 78. The intervals L1 and L2 are not aligned to ensure no light can flow through the light shield 70. Points B1, B2 are used to respectively indicate two any closest points of two adjacent second light-shielding plates 74. A straight line connecting the points B1, B2 is certain to intersect one of the first light-shielding plates 72. That is to say that there should be no straight-line path from the top side to the bottom side (as viewed in FIG. 3) of the fixing plate 76 capable of avoiding the first light-shielding plates 72 or the second light-shielding plates 74. Thus, light emitted by the light source 30, which locates at a side of the second light-shielding plate 74, can not pass through the light shield 70 along a straight path. Accordingly, light leaking from the outlet 12 can greatly reduced.

An interval L3 is to indicate an interval between the distal ends of the first light-shielding plates 72 and the distal ends of the second light-shielding plates 74 configured for desired airflow and heat exchange within the light shield 70.

In this embodiment, the sum of the first angle $\alpha1$ and the second angle $\alpha2$ is 180°. For example, the first angle $\alpha1$ is 45° and the second angle $\alpha2$ is 135°. The interval L1 is greater than the interval L2. It is to be understood that the first angle $\alpha1$ can be an obtuse angle, while the second angle $\alpha2$ can be a sharp angle. A sum of the first angle $\alpha1$ and the second angle $\alpha2$ can be more than or less than 180°.

Non-alignment of the first light-shielding plates 72 and the second light-shielding plates 74 ensures air can not flow through the light shield 70 smoothly resulting that it escapes a heat exchange process, yet the intervals L1, L2, L3 still provide enough space to ensure that airflow is free enough to allow the quickest airflow. Accordingly, heat of the light source 30 is efficiently dissipated without allowing light to leak through from the light source 30 along a direct path.

Figure 4:
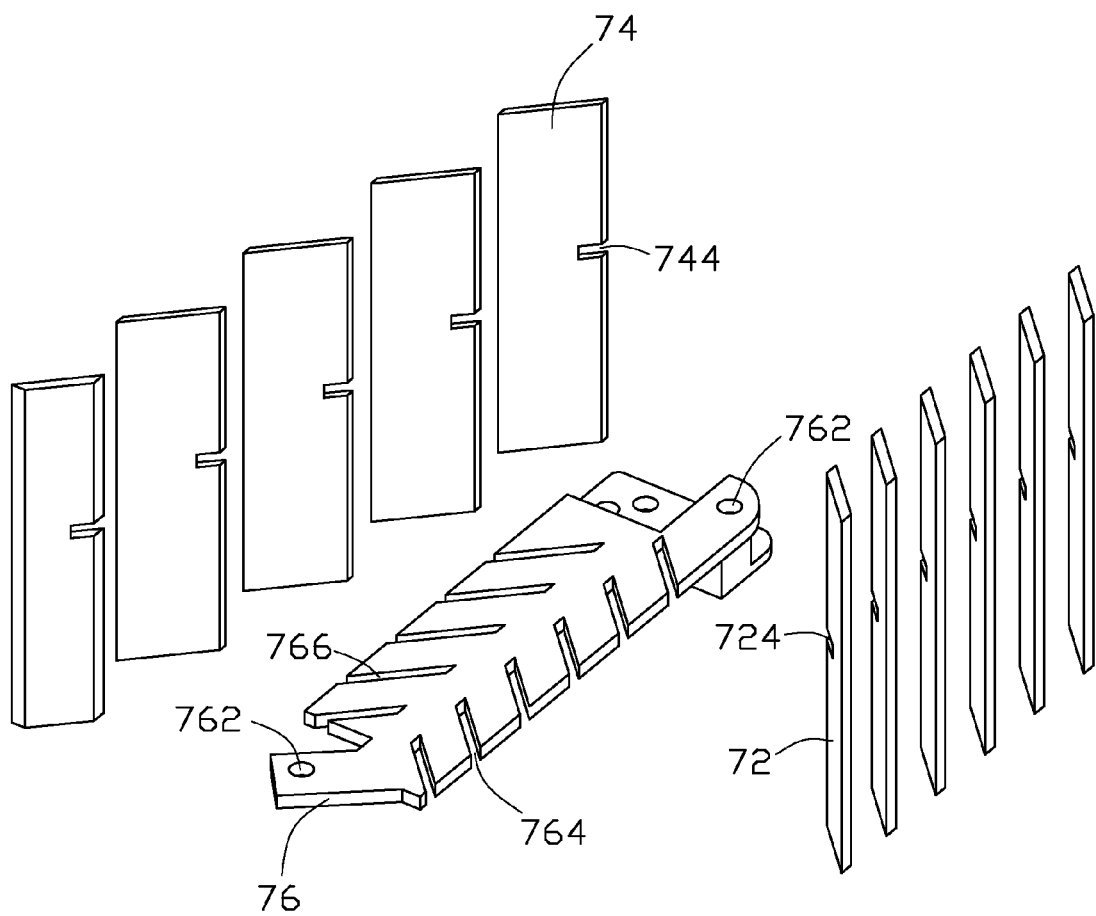
FIG. 4 is an isometric, exploded view of the light shield shown in FIG. 3.

Referring to FIG. 4, the fixing plate 76 of the light shield 70 has a plurality of parallel first grooves 764 corresponding to the first light-shielding plates 72 and a plurality of parallel second grooves 766 corresponding to the second light-shielding plates 72. The first and second grooves 764, 766 are arranged in an alternate order. The first and second grooves 764, 766 are used to engage with the first light-shielding plates 72 and the second light-shielding plates 74 respectively. Correspondingly, third grooves 724 and fourth grooves 744 are respectively formed on middle portions of the first light-shielding plates 72 and the second light-shielding plates 74. The third grooves 724 and the fourth grooves 744 are shorter than the first and second grooves 764, 766. The first and second light-shielding plates 72, 74 and the fixing plate 76 can be combined via insertion of the third and fourth grooves 724, 744 and the first and second grooves 764, 766. It is to be understood that the first light-shielding plates 72 and second light-shielding plates 74 are secured to the fixing plate 76 by any conventional means of fastening.

The light shield 70 can be made of molded plastic or metal. The light shield 70 of metal can also be used to dissipate heat of the casing 10 so as to improve heat dissipation efficiency of the projector 100.

It is to be understood that the light shield 70 can be assembled with more than one fixing plate 76 or be an integral part of the casing 10, such as a part of the casing 10 adjacent to the outlet 12. The first and second light-shielding plates 72, 74 can be secured to the fixing plate 76 by means of soldering.

It is to be understood that the fixing plate 76 can also be secured to other components in the casing 10 which are adjacent to the outlet 12, such as a circuit board. The light shield 70 can also be positioned on the inlet opening 14. The inlet opening 14 can also be positioned on a top of the casing 10 adjacent to the lateral walls of the casing 10.

Figure 5:
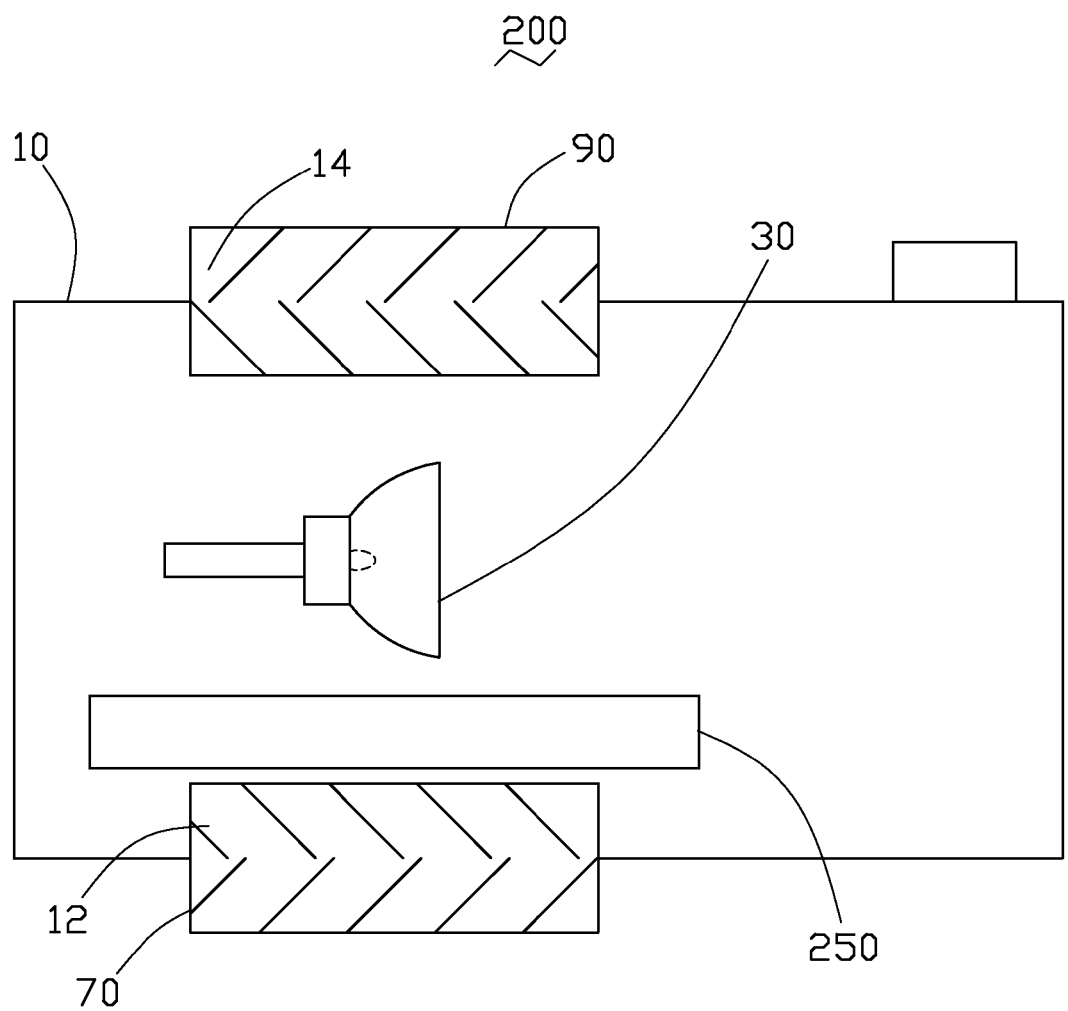
FIG. 5 shows a schematic view of a projector in accordance with a second exemplary embodiment of the present invention.

Referring to FIG. 5, an electronic device 200 in accordance with another embodiment of the present invention is shown. The electronic device 200 comprises a casing 10, a light source 30 installed inside the casing 10, and a heat dissipation device 250. The casing 10 has an inlet opening 14 and an outlet opening 12 respectively formed on lateral walls thereof. Two light shields 70, 90 are respectively secured to the outlet opening 14 and the inlet opening 12. The heat dissipation device 250 is a fan or a blower positioned between the light source 30 and the light shield 70. Thus, leakage of light from the casing 10 can be further reduced. The working principle of this embodiment is the same as that of the above-mentioned embodiment, and the detailed description is omitted thereby.

It is believed that the present invention and its advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

What is claimed is:

1. A projector comprising:
a casing whereon a first opening and a second opening are respectively formed on two opposite sides thereof;
a light source installed inside the casing and positioned between the first opening and the second opening;
a light shield disposed on the first opening and connected with the casing, the light shield comprising a fixing plate positioned parallel to the first opening, a plurality of first light-shielding plates, and a plurality of second light-shielding plates, the first light-shielding plates and the second light-shielding plates being perpendicularly connected to the fixing plate and respectively located at a top side and a bottom side of the fixing plate, the fixing plate having a central line in a middle thereof, the first light-shielding plates and the second light-shielding plates being respectively arranged at two opposite lateral sides of the central line, a first line being used to indicate where a plane of one of the first light-shielding plates intersects the central line in the top plane view, a second line being used to indicate where a plane of one of the second light-shielding plates intersects the central line in the top plane view, an intersection of the first line and the central line does not meet an intersection of the second line and the central line, and the first light-shielding plates and the second light-shielding plates being staggered obliquely so that no straight-line path from a top side to a bottom side as viewed in a top plane view of the fixing plate capable of avoiding the first light-shielding plates or the second light-shielding plates; and
a heat dissipation device disposed on the second opening and connected with the casing.

2. The projector of claim 1, wherein a first interval between closest points of two adjacent first light-shielding plates and a second interval between closest points of two adjacent second light-shielding plates are not aligned to ensure no light can flow through the light shield.

3. The projector of claim 2, wherein the light source is located on a side of the second light-shielding plates, and a straight line connecting the closest points of two adjacent second light-shielding plates intersects one of the first light-shielding plates.

4. The projector of claim 1, wherein the first light-shielding plates are arranged parallel to and spaced from each other at uniform intervals, and the second light-shielding plates are arranged parallel to and spaced from each other at uniform intervals.

5. The projector of claim 1, wherein distal ends of the first and second light-shielding plates are separate from the central line.

6. The projector of claim 1, wherein a first angle between the first line and the central line is a sharp angle, and the second angle between the second line and the central line is an obtuse angle.

7. The projector of claim 1, wherein a plurality of grooves are formed on the fixing plate, the first light-shielding plates, and the second light-shielding plates respectively.

8. The projector of claim 1, wherein the heat dissipation device is selected from the group of a fan and a blower.

9. A light shield comprising:
a fixing plate having a central line in a middle thereof;
a plurality of first light-shielding plates; and
a plurality of second light-shielding plates;
wherein the first light-shielding plates and the second light-shielding plates are perpendicularly connected to the fixing plate and respectively located at two opposite sides of the fixing plate, the first light-shielding plates and the second light-shielding plates are respectively arranged at two opposite lateral sides of the central line of the fixing plate, a first line is used to indicate where a plane of one of the first light-shielding plates intersects the central line in the top plane view, a second line is used to indicate where a plane of one of the second light-shielding plates intersects the central line in the top plane view, an intersection of the first line and the central line does not meet an intersection of the second line and the central line, the first light-shielding plates and the second light-shielding plates are staggered so that no straight-line path from a top side to a bottom side as viewed in a top plane view of the fixing plate capable of avoiding the first light-shielding plates or the second light-shielding plates.

10. The light shield of claim 9, wherein a first interval between closest points of two adjacent first light-shielding plates and a second interval between closest points of two adjacent second light-shielding plates are not aligned to ensure no light can flow through the light shield.

11. The light shield of claim 10, wherein a straight line connecting the closest points of two adjacent second light-shielding plates intersects one of the first light-shielding plates.

12. The light shield of claim 9, wherein the first light-shielding plates are arranged parallel to and spaced from each other at uniform intervals, and the second light-shielding plates are arranged parallel to and spaced from each other at uniform intervals.

13. The light shield of claim 9, wherein distal ends of the first and second light-shielding plates are separate from the central line.

14. The light shield of claim 9, wherein a first angle between the first line and the central line is a sharp angle, and the second angle between the second line and the central line is an obtuse angle.

* * * * *